(12) United States Patent
Rezner

(10) Patent No.: US 10,549,727 B2
(45) Date of Patent: Feb. 4, 2020

(54) WHEEL CLEANING SYSTEM

(71) Applicant: Matthews Tire, Inc., Appleton, WI (US)

(72) Inventor: Trevor Rezner, Appleton, WI (US)

(73) Assignee: Matthews Tire, Inc., Appleton, WI (US)

( * ) Notice: Subject to any disclaimer, the term of this patent is extended or adjusted under 35 U.S.C. 154(b) by 128 days.

(21) Appl. No.: 15/681,993

(22) Filed: Aug. 21, 2017

(65) Prior Publication Data
US 2019/0054901 A1    Feb. 21, 2019

(51) Int. Cl.
| B60S 3/04 | (2006.01) |
| B24B 19/26 | (2006.01) |
| B24B 21/16 | (2006.01) |
| B24B 55/06 | (2006.01) |

(52) U.S. Cl.
CPC .............. B60S 3/042 (2013.01); B24B 19/26 (2013.01); B24B 21/16 (2013.01); B24B 55/06 (2013.01)

(58) Field of Classification Search
CPC ......... B24B 19/26; B24B 21/16; B24B 55/06; B24C 9/00; B60S 3/042
See application file for complete search history.

(56) References Cited

U.S. PATENT DOCUMENTS

| 1,412,985 A | 4/1922 | Walther | |
| 2,915,766 A * | 12/1959 | Peterson | ................... B08B 1/04 15/21.1 |
| 3,300,902 A * | 1/1967 | Dockery | ................. B24C 9/006 209/137 |
| 3,599,375 A * | 8/1971 | Nunemaker | .............. B24C 3/06 451/102 |
| 4,300,318 A * | 11/1981 | Brown | ...................... B24C 3/02 451/38 |
| 4,426,747 A | 1/1984 | Mola et al. | |

(Continued)

FOREIGN PATENT DOCUMENTS

| CN | 101596689 B | 9/2010 |
| CN | 101898321 B | 3/2012 |

(Continued)

OTHER PUBLICATIONS

WC-30 Wheel Cleaner, TSISSG (Tire Service Equipment Mfg. Co., Inc.), https://tsissg.com/product/wc-30/.

(Continued)

*Primary Examiner* — Timothy V Eley
(74) *Attorney, Agent, or Firm* — BakerHostetler

(57) ABSTRACT

Wheel cleaning systems and methods are described for removing corrosion from a wheel rim. An enclosure comprises a plurality of walls that define a work area, and houses a turntable that can hold a wheel rim. The turntable is driven by a motor to rotate the wheel about an axis. The enclosure may have a transparent shield or window to allow a user to view the wheel during the cleaning process and be protected from sparks and other debris. The enclosure may be fully enclosed with gloved openings, or contain one or more open sections to allow the user to maneuver a tool (e.g., a grinder) in multiple positions within the enclosure, and clean the wheel rim. The system further comprises an exhaust unit that draws out small particles and airborne debris from within the enclosure, and produced during a cleaning process.

20 Claims, 6 Drawing Sheets

(56) References Cited

U.S. PATENT DOCUMENTS

| | | | |
|---|---|---|---|
| 4,532,665 A | | 8/1985 | Evans |
| D323,661 S | * | 2/1992 | Zwicker ................. D15/124 |
| 5,143,102 A | * | 9/1992 | Blaul ................. B08B 3/006 |
| | | | 134/113 |
| 5,161,281 A | | 11/1992 | Hanen |
| 5,964,002 A | | 10/1999 | Schaal |
| 6,099,395 A | * | 8/2000 | Gusennan ............. B24C 9/00 |
| | | | 451/75 |
| 6,217,424 B1 | | 4/2001 | Stephens |
| 6,364,748 B1 | * | 4/2002 | Zwicker ............... B24C 9/00 |
| | | | 451/38 |
| 6,957,999 B1 | | 10/2005 | Motta et al. |
| 7,234,186 B2 | | 6/2007 | Peters |
| 7,249,994 B2 | * | 7/2007 | Sommacal ........... B24C 1/003 |
| | | | 451/88 |
| 8,662,960 B2 | | 3/2014 | Inatani |
| 9,623,539 B2 | * | 4/2017 | Robinson ............. B24C 9/00 |
| 10,040,163 B2 | * | 8/2018 | Eo ..................... B24B 29/04 |
| 2007/0238400 A1 | * | 10/2007 | Carrell ................. B24C 9/00 |
| | | | 451/89 |

FOREIGN PATENT DOCUMENTS

| | | |
|---|---|---|
| CN | 102029567 B | 12/2012 |
| CN | 204639893 U | 9/2015 |
| CN | 205271669 U | 6/2016 |
| JP | 2001149198 A | 6/2001 |
| WO | WO1991001819 A1 | 2/1991 |
| WO | WO2015149474 A1 | 1/2015 |

OTHER PUBLICATIONS

P400 Aircraft Paint Removal System, Odlings MCR, http://www.odlingsmcr.co.uk/aviation/aircraft-wheel-and-brake-paint-removal/.

Puma-Wheel Cleaning, The Massfin, Inc., http://www.massfin.ca/puma-wheel-cleaning.php.

Vis-Polish, VIS, http://www.vischeck.net/vis-polish/.

* cited by examiner

WHEEL CLEANING SYSTEM

TECHNICAL FIELD

The present invention relates generally to systems and methods for cleaning vehicle wheel rims. More particularly, the present invention relates to systems and methods for cleaning wheel rims while protecting users during cleaning operations. Certain embodiments include an enclosure housing a stand for a wheel rim, the enclosure comprising an open portion to access the stand, and a transparent shield to safely view the wheel rim during cleaning.

BACKGROUND

Corrosion, dirt, and grime can build up on wheel rims over time, from exposure to weather and other elements during normal operation. Corrosion, in particular, often occurs on mating surfaces (e.g., the lip of the rim) which engage the bead of the tire, and the center of the rim, where the rim engages the hub. Corrosion in these areas is problematic, since it can prevent a good seal from being formed between the wheel and the tire, and prevent the wheel from mounting correctly on the hub.

The corrosion is often cleaned from these areas when tires are changed, since it is necessary to remove the tire from the wheel rim. To clean the rim, a grinder can be used to remove the corrosion from the affected areas. Current grinders use an enclosed shop vacuum to suck up metal filings as they are ground from the wheel. However, since the grinding process produces metal filings, which often include both aluminum and iron filings, there is a concern that the mixing of metal filings within the shop vacuum can produce a dielectric discharge and is a fire hazard.

SUMMARY

This disclosure generally relates to systems and methods for cleaning automotive wheel rims. An enclosure is provided to contain filings produced during an abrasive cleaning process, which allows for easy and efficient removal after cleaning. An upper portion of the enclosure may include a transparent shield, which allows users to see into the enclosure, while being protected from any debris or sparks produced by the cleaning process. The lower portion of the enclosure may include an opening, which allows users to operate a cleaning tool, such as a grinder.

In an embodiment, the enclosure may be completely enclosed. Gloved openings are provided to allow users to insert their hands and operate the grinder, while being protected from debris and hazards within the enclosure. In various embodiments, the user is free to move the cleaning tool within the enclosure, to clean from multiple positions (e.g., grind the hub area and edge, or maneuver a grinder for more effective cleaning).

Inside the enclosure, a stand with a turntable receives a wheel rim. In an embodiment, the turntable comprises a plurality of chucks to mount or secure the wheel rim. The turntable is driven by a motor to rotate the mounted wheel rim about an axis. In one example, the axis is a vertical axis. The rotational speed of the wheel may be constant or variable. Rotation can be started by an on/off switch. In another embodiment, the motor is operated by a foot pedal controller, so that a user can utilize both hands for operating the grinder inside the enclosure.

The wheel cleaning system further comprises an exhaust fan and filter assembly that may be mounted at the top of the enclosure. The exhaust unit draws out smoke and other airborne pollutants created by the cleaning or grinding process. The exhaust fan and filter may be controlled and operated through a control panel installed on the enclosure's shield, or elsewhere on the enclosure.

BRIEF DESCRIPTION OF THE DRAWINGS

Various non-limiting embodiments are further described with reference to the accompanying drawings in which.

DETAILED DESCRIPTION OF ILLUSTRATIVE EMBODIMENTS

Various examples of the present disclosure described herein in are generally directed to systems for, among other things, cleaning automotive and light truck wheel rims, and reducing hazards in such operations. It will be understood that the provided examples are solely for purposes of clarity and understanding and are not meant to limit or restrict the claimed subject matter or relevant portions of this disclosure in any manner.

Figure 1:
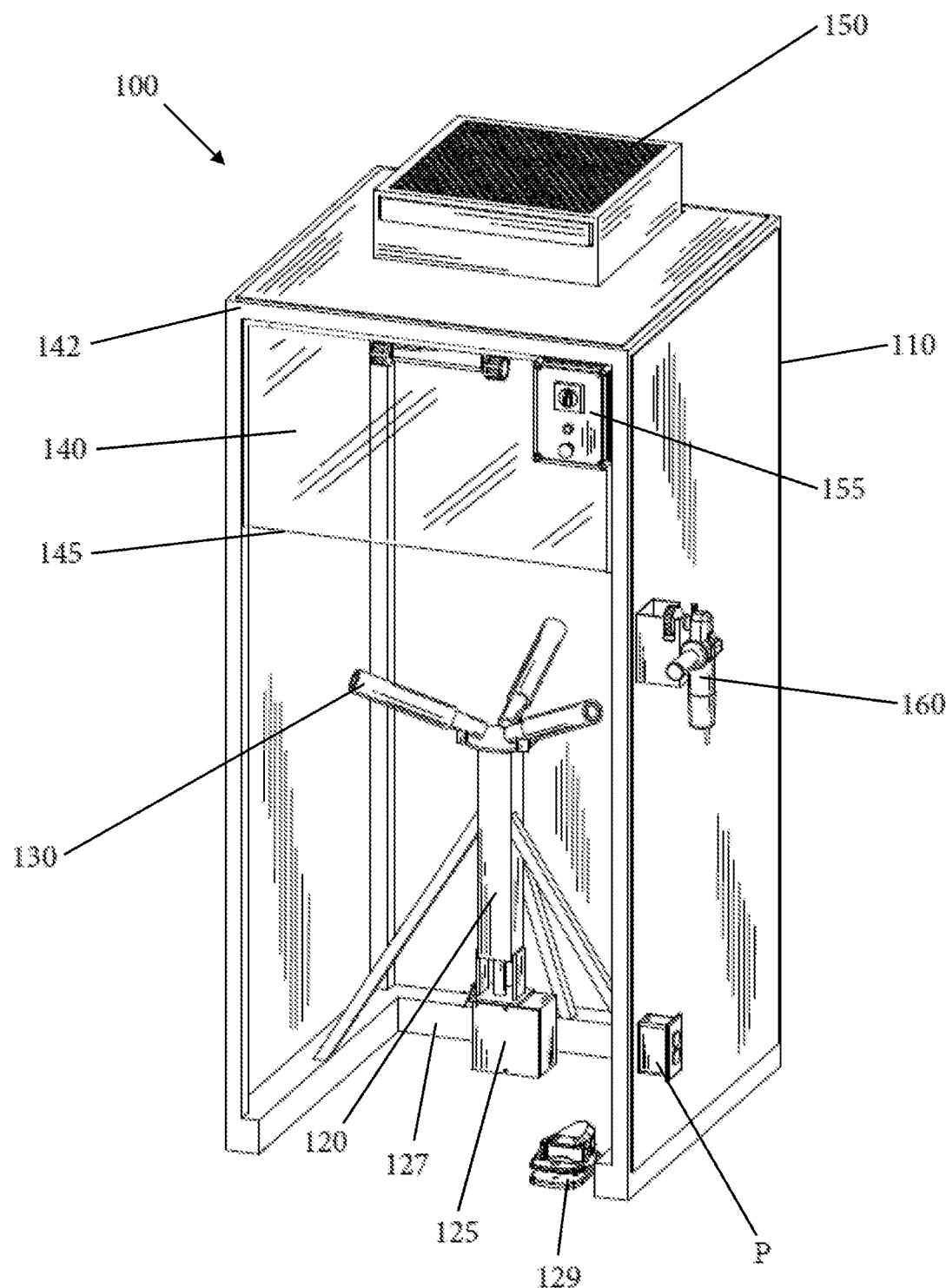
FIG. 1 illustrates an example wheel cleaning system.

Turning to FIG. 1, an example wheel cleaning system 100 is depicted, comprising an enclosure 110, stand 120, turntable 130, shield 140, exhaust unit 150, and cleaning tool 160. The enclosure 110 may be comprised of glass, plastic, LEXAN, fire-resistant material, or other material capable of implementing or supporting the various system components described herein, and protecting the user from debris and hazards created by the wheel rim cleaning processes. Moreover, the enclosure contains grindings, sparks, debris, and other large particles produced from the grinding and cleaning processes. This containment may facilitate easy removal of those particles, and reduce the risk of fire, user injury, and other hazards inherent in traditional grinding and cleaning processes.

In some embodiments, the enclosure may be partially enclosed, with an open vertical side, as depicted in FIG. 1, to allow access to internal components (e.g., wheel, turntable, stand, and chuck). The enclosure may be fully enclosed on all sides, and include a door on a vertical side, to allow access into the enclosure. The paneling on the vertical sides of the enclosure can be transparent, to allow the user and other individuals to clearly view the wheel rim, while being protected from debris and sparks during the cleaning process. In another example, only one side or section may be transparent, such as shield 140. In another embodiment, the enclosure further comprises a floor, which collects filings, shavings, dirt, and other large particles from the cleaning process, and allows for efficient cleaning and removal of such debris. Depending on the environment in which the wheel cleaning system is used, a floor may protect and prevent damage to the underlying building or warehouse flooring. In another embodiment, the floor is raised to facilitate the sweeping of grindings produced inside the enclosure into a dust pan or other container for recycling or disposal. The floor may also comprise a removable pan to facilitate efficient removal of debris and large particles from the base of the enclosure. It will also be understood that various combinations of transparency, materials, and degrees of enclosure are possible, and may be implemented in accordance with embodiments described herein, depending on design, cost, and other considerations.

A stand 120 is provided within enclosure 110 to support a wheel W during a grinding operation. The stand 120 is designed to be capable of withstanding the weight of the wheel, as well various translational and rotational forces occurring from the wheel and turntable during the cleaning operations. In general, stand 120 supports a wheel at a height 320 suitable for performing a grinding operation. In the example, stand 120 supports wheel at height 320 suitable for performing grinding operation while the user is in a standing position. The stand places wheel at about waist level or slightly above waist level to allow the users arms to form roughly a 90 degree angle with their upper body for maximum leverage and comfort during the grinding operation. This position also facilitates movement of the arms inward and outward from enclosure 110 with minimal interference from surrounding structures such as the shield and edges of the enclosure 110. The height of stand 120 may be adjustable to accommodate users of varying height. Stand 120 may include a turntable 130 to rotatably support wheel W. Turntable 130 rotates relative to stand 120. Alternatively, stand 120 may include rolling elements on which the wheel W is rotatably supported.

Turntable 130 may be selectively rotated by user. The turntable's rotation may be at a constant or variable speed. Turntable 130 may be rotated manually or by a motor 125. In an example, motor 125 is installed at the base 127 of stand 120. A motor controller 129 is provided to control rotation of turntable 130. In an example embodiment, the controller is an on/off switch. In other examples, motor controller 129 may be used to vary the speed or direction of rotation. Motor controller 129 may be located on the enclosure 110 or remote from the enclosure 110. Motor controller 129 may be any suitable controller including but not limited to a switch, a dial, a keypad, slide, or a foot pedal 170 as shown.

Figures 3, 4:
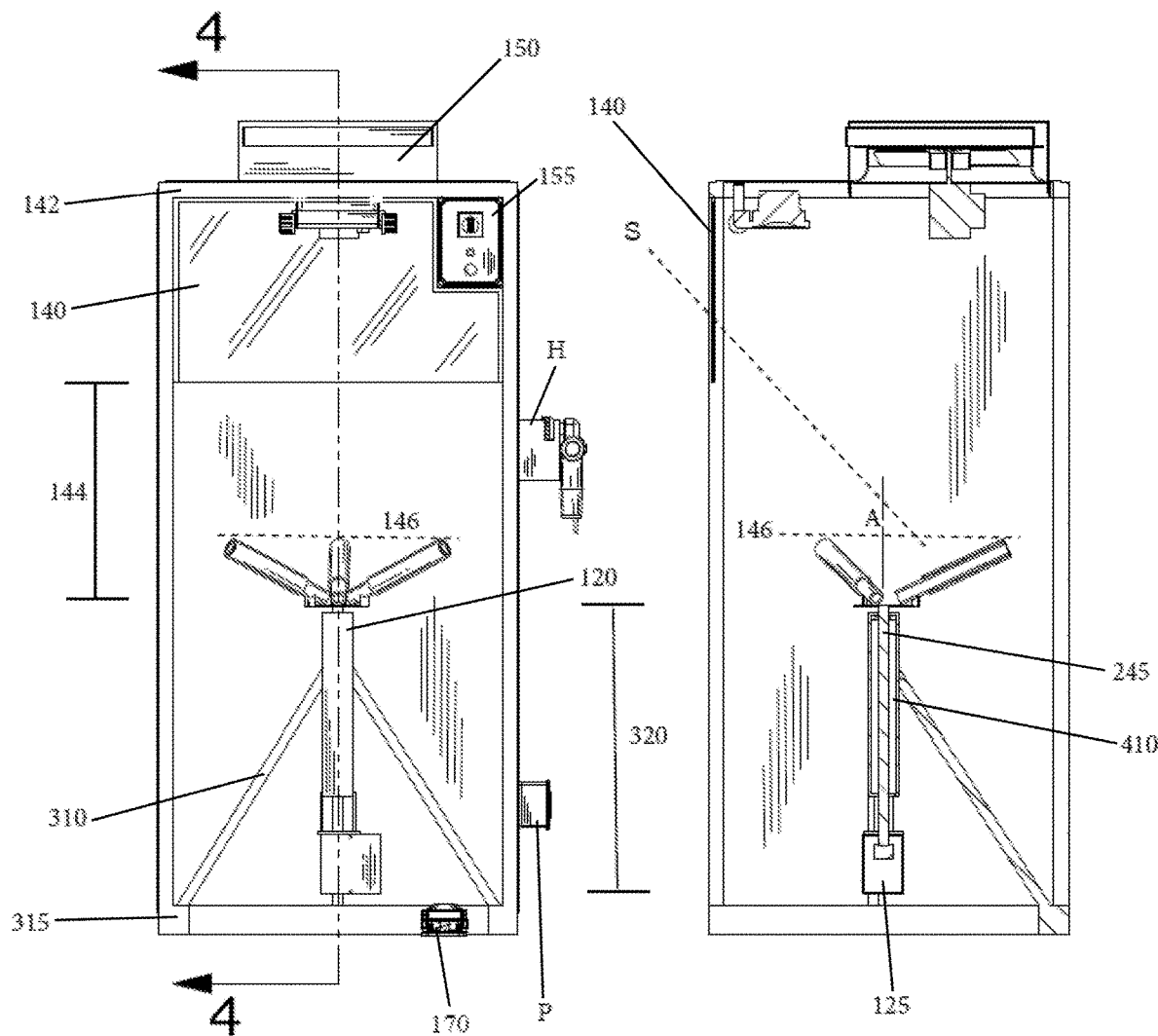
FIG. 3 illustrates a front view of the wheel cleaning system, in accordance with the subject of the invention.
FIG. 4 illustrates a cross-sectional view of the wheel cleaning system and stand assembly, along perspective line 4-4 of FIG. 3.

With reference to FIG. 1, a shield 140 is shown. In the example, shield 140 extends from the top 142 of enclosure 110 downward toward base 127 of enclosure 110. In the example, shield 140 is truncated before reaching base 127 to facilitate ingress and egress of grinder within enclosure 110. As best shown in FIGS. 3 and 4, shield 140 extends downward from top 142 of enclosure 110 to a point above turntable 120, defining a grinder clearance 144 between a lower edge 145 of shield 140 and a support plane 146 defined by turntable 120. The clearance 144 provides space to insert grinder and manipulate it to perform a grinding operation as described more completely below. As discussed, shield 140 is transparent, allowing the user to observe the grinding process while being protected from debris and sparks created during grinding.

Figure 8:
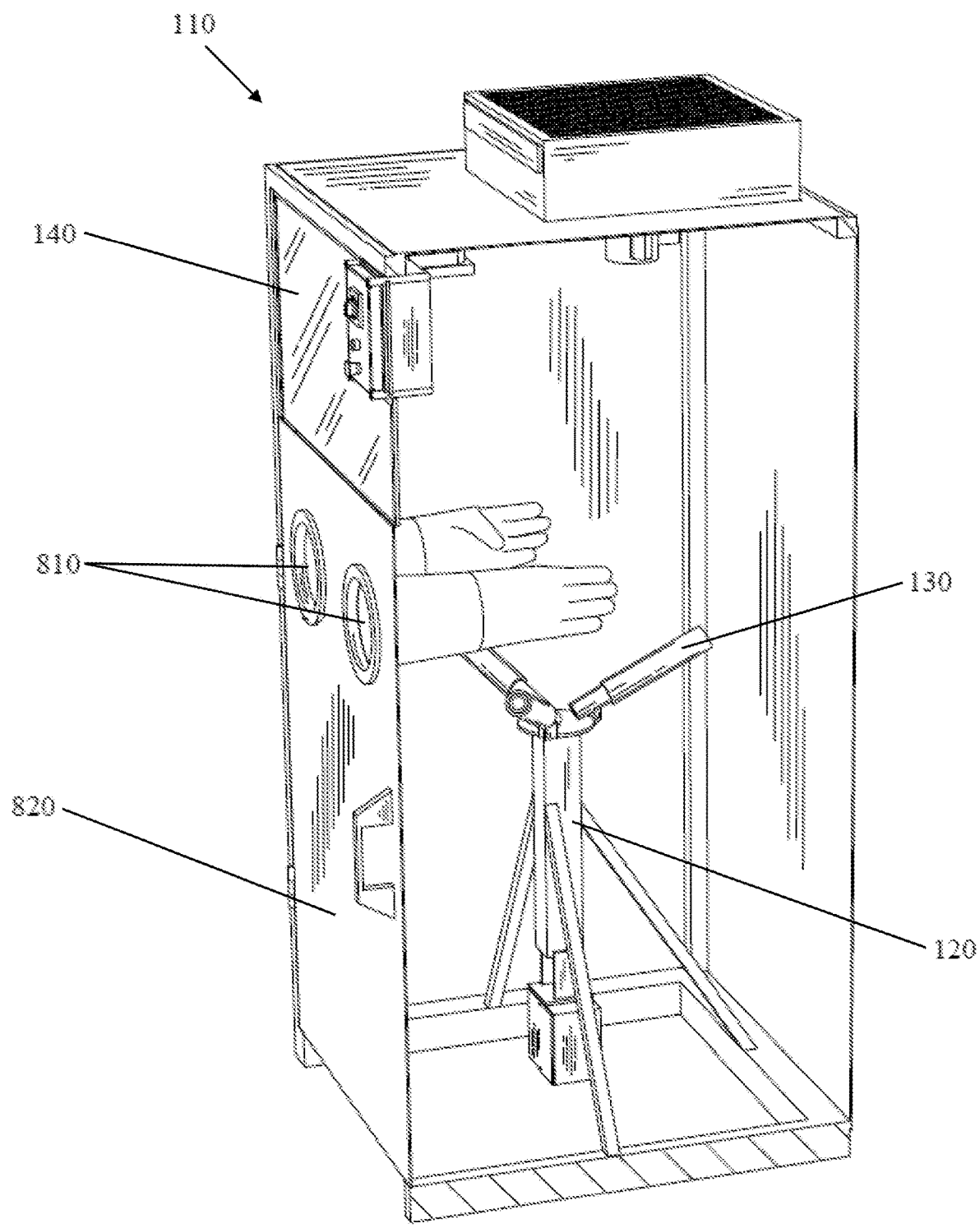
FIG. 8 illustrates another example wheel cleaning system including a door that closes the open portion and includes gloved openings.

In the example, shield 140 provides a transparent area above turntable 130 providing a sightline S for user to observe the grinding operation. As best seen in FIG. 4, sightline S extends at a downward angle toward turntable 130 with shield 140 interposed in sightline S between the user and the turntable 130 to block debris or sparks from grinding operation from reaching the user's upper body, face and eyes. In other embodiments (FIG. 8), additional protection may be provided by employing a wall on enclosure 110 that includes a panel or door that includes gloved ports or openings 810 that allow the user to handle the grinder within the enclosure while being completely separated from the interior of the enclosure 110. In an embodiment, the wall on the enclosure is removable, or opens partially or completely, to serve as a door 820. The door 820 provides an opening allowing a user to mount a wheel rim on the stand 120, or to remove the wheel rim from the interior of the enclosure. In other embodiments, the doorway is on the side or back vertical paneling of the enclosure.

An exhaust unit 150 may be mounted on the top of the enclosure, to remove smoke and other airborne pollutants from within the enclosure. An exhaust control panel to control power and intensity of the exhaust unit may be located on the enclosure 110 or remote from the enclosure 110. In an embodiment, the exhaust control panel 155 is on the shield 140.

A grinder 160 may be used as the cleaning tool to clean and remove corrosion and other unwanted dirt layers from the wheel. Grinder 160 is shown as a separate implement, such as an angle grinder or the like. Enclosure 110 includes a power supply P to which the grinder 160 may be electrically connected. In the example power supply P includes an outlet that is mounted on the exterior of the enclosure near the access opening provided for cleaning the wheel. It will be appreciated that grinder 160 may be a battery operated tool or a power outlet within the shop may be used in the alternative to the power supply P provided on enclosure 110. Grinder 160 can be manually operated by a user to easily remove build up on a mounted wheel rim. During a cleaning operation, the wheel can be rotated manually, or rotated by the turntable and motor assembly. In one embodiment, open sections of the enclosure (e.g., clearance 144) allow the user access to the wheel during grinding and cleaning. Transparent shield 140, allows the user to see inside the enclosure, and be protected during the grinding operations. The grinder 160 can be mounted to a holder H on a side of the enclosure, for convenience and ease of access. In the example, holder H is located at roughly the same level of access opening or slightly higher or lower to facilitate supporting the grinder in a position that is easily visible to the user and within reach when the user is in the position to perform the grinding operation. It will be understood that such positioning also is helpful when an operator is wearing a face shield or other protective gear that may limit movement and vision. In the example, holder H is also provided on the same side of enclosure as power supply P to facilitate an electrical connection between grinder 160 and power supply P and to prevent cord entanglement or catching on the enclosure.

Figure 2:
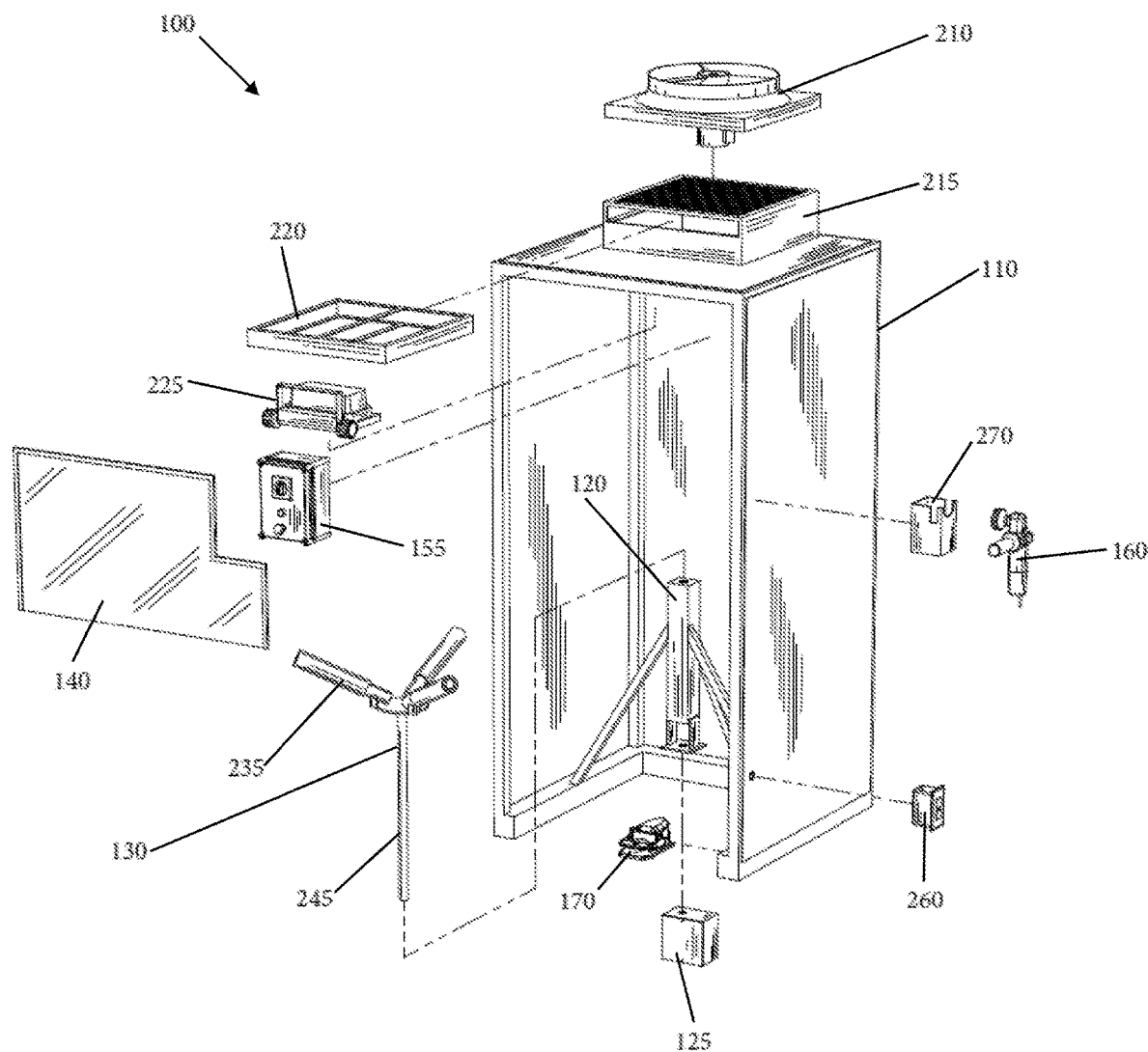
FIG. 2 illustrates a detailed view of the wheel cleaning system, in accordance with the subject of the invention.

FIG. 2 depicts a wheel rim cleaning system 100 according to an example in greater detail. The exhaust fan unit 150 comprises a fan 210, housing unit 215, filter 220, and an intake unit 225 to draw smoke, fumes, small particles, and airborne debris out from within the enclosure 205. The fan 210 suctions air into the intake unit 225, through the filter 220. The filter 220 captures particles, pollutants, and airborne debris. In some embodiments, the intake unit 225 further comprises a light, such as an LED light, to illuminate the interior of the enclosure 110. The light's power and intensity may be controlled by the exhaust control unit 155.

In an embodiment, as depicted in FIGS. 1-2, the exhaust housing unit 215 contains the exhaust fan 210 and filter 220.

The fan 210 and filter 220 are removable from the housing unit 215, for cleaning or replacement. In an embodiment, the housing unit 215 affixes to the roof of the enclosure.

The exhaust unit 150 may be powered externally, or controlled by exhaust control unit 155. The control unit 155 turns the exhaust unit 150 on/off, and may control fan speed and intensity of the air suction within the enclosure. In an embodiment, the control unit 155 includes an emergency stop button or switch for safety. In some designs, the exhaust control unit 230 resides in a cutout of the transparent shield 235, as depicted, for ease of access by the user. In another example, the control unit 155 is any suitable controller including but not limited to a switch, a dial, a keypad, or slide.

The transparent shield 140 provides a window for the user to see within the enclosure during the cleaning process. The shield 140 extends downwards to the top of the mounted wheel assembly, or other desired length, to enable user access to the turntable and wheel. In an embodiment, the shield extends downward far enough to accommodate users of varying heights. For example, as best seen in FIG. 4, an angle A forms between a user's sightline S and the plane of the turntable 146. The angle A will vary depending on user height. A larger angle A is associated with taller users than shorter users. In an example embodiment, the shield 140 extends downward to accommodate a range of sightline angles associated with users within a particular height range. In an alternative embodiment, the shield's length corresponds to a particular user, user height, or sightline angle.

The opening beneath the shield (e.g., clearance 144) allows the user to maneuver the grinder, wheel rim, or turntable in multiple positions within the enclosure 110. In one embodiment, the enclosure's opening extends from the from the bottom portion of the shield 235 to the floor. In another embodiment, the enclosure may be fully enclosed below the shield, and contain gloved openings that allow the user to handle the grinder within the enclosure. In this example, the user remains separated from the enclosure's interior, and is protected from debris and sparks from the cleaning process.

A stand 120 within the enclosure 110 supports a turntable 130 for mounting a wheel. In an embodiment, the stand comprises a plurality of legs 310. The legs 310 may be affixed to a part of the enclosure, such as a lip 315 around the enclosure's base, or a floor of the enclosure. Alternatively, the stand may be separate from the enclosure. In these examples, the stand's height 320 and position within the enclosure can be adjusted to accommodate user height, comfort, or preference.

The turntable 130 holds the wheel W during the cleaning process. The user can selectively control the turntable to rotate the wheel about an axis. The rotation may be manually controlled, or motor controlled, as described further below. The turntable 240 may comprise a plurality of chucks 235 and a shaft 245. The plurality of chucks 235 provide a platform for mounting the wheel rim during the cleaning process. In an embodiment, the chucks 235 may adjust to secure the wheel during the cleaning process or turntable rotation. The chucks may also be adjusted or interchangeable, to accommodate various wheel rim sizes.

The shaft 245 secures the turntable to the stand 120. The shaft's height may be adjustable, to place the turntable and wheel rim at a height 320 suitable for a user to perform cleaning operations, as described above. In an embodiment the base of the shaft 245 connects to a motor unit 255, which can drive the rotation of the turntable relative to the stand. In an embodiment, the turntable is removable from the stand 120.

Beneath the stand 120 is a motor unit 125 that can receive the shaft of the turntable, and rotate the turntable about an axis. A gear motor within the motor unit may receive external power (e.g., from power unit 260) and drive the rotation of the shaft 245. In one example, the axis of rotation is a vertical axis. In another embodiment, the motor rotates the turntable at a constant speed, or variable speeds. Additionally, a power unit 260 may be provided on or within the enclosure to provide external power to the motor unit 255 and other electronic components in the system. In an embodiment, a user controls the motor unit 255 with an on/off switch, or a foot pedal controller 170. The on/off switch may be present on a control panel located on or within the enclosure, similar to the exhaust control unit. In on example, the motor control and the exhaust control are located on the same panel, which may be located on the enclosure, in an easily accessible position for the user. In another embodiment, a foot pedal controller 170 could allow the user to control power and/or speed of the motor unit and turntable rotation. A foot pedal, or similar control apparatus, would allow the user to utilize both hands when cleaning the wheel. This may increase the user's range of motion within the enclosure, and the user's ability to operate the grinder 160 from multiple positions.

The grinder 160 abrasively removes corrosion and layers of dirt and debris from a wheel rim. A user can manually operate the grinder to contact the mounted, wheel rim within the enclosure, and remove corrosion to clean the wheel. As discussed above, the enclosure 110 and transparent shield 140 allow the user to view the wheel through sightline S during the cleaning process, while being protected from sparks and debris that may be created from grinding and/or cleaning processes. The enclosure design also allows the user to freely move the grinder within the enclosure, and manually clean the wheel from multiple positions. For example, the user can move the grinder to grind the hub area and the edge of the wheel rim, and maneuver the grinder with varying pressure and angles to more effectively remove corrosion and unwanted layers. In an embodiment, a holder 270 affixed to the enclosure 110 holds the grinder 160 or other cleaning tools. The holder 270 further enables easy access and storage during and after the cleaning process. Additionally, it will be understood that various cleaning tools may be used to clean the wheel rim, in accordance with embodiments of the present invention.

FIG. 3 illustrates a front view of the wheel cleaning system, and FIG. 4 illustrates a cross-sectional view along perspective line 4-4. As best seen in the embodiment depicted in FIG. 3, the upper portion of enclosure 110 contains a transparent shield 140 extending downward from the top of the enclosure 142 to protect a user working on a wheel mounted on the a plane 146 of the turntable. A clearance 144 extends from the bottom of the shield, to the top of the turntable. The clearance 144 below the shield allows a user to comfortably operate on the wheel while standing. In an embodiment, the clearance allows the user to manually operate a grinder within the enclosure. In particular, the clearance allows inward and outward arm movements from the enclosure, and space to maneuver a cleaning tool with the desired leverage and pressure. The shield may extend farther down, depending on the desired amount of user protection, the height 320 of the stand unit 120, or the height of the enclosure 110, for example. Furthermore, there may more than one protective shield, or transparent siding along various sides and portions of the enclosure.

The height 320 of stand 120 places the wheel at a position suitable for a user to clean a wheel rim while standing. The height 320 may be adjusted, as discussed above, depending on user height or preference (e.g., a desired clearance 144). The stand may be supported by a plurality of legs 310 attached to the base of the enclosure 315, or separate from the enclosure, which may assist height 320 adjustments.

In this embodiment, the exhaust unit 150 is on the top of the enclosure, while the exhaust control unit 155 is accessibly placed on the front of the enclosure, at an upper portion of the shield 140. The cleaning tool 160 can be stored on a stand 270 on the side of the enclosure.

In an embodiment, the motor unit 125, which rotatably drives the turntable about an axis, is at the base 127 of the stand. The cross-sectional view of FIG. 4 shows this structure in greater detail. Here, the turntable's shaft 245 fits within a hollow vertical column 410 of the stand, and the bottom of the shaft is inserted into the motor unit 125. In addition to the vertical column 410, the stand may comprise legs 310 that support the vertical column 410, and are fixed to the enclosure 110. In some embodiments, the support legs 310 are installed on a lip 315 surrounding the bottom perimeter, pf the enclosure, or the floor of the enclosure. In some embodiments, the stand shaft and legs may be removable, or permanently installed within the enclosure.

Figure 5:
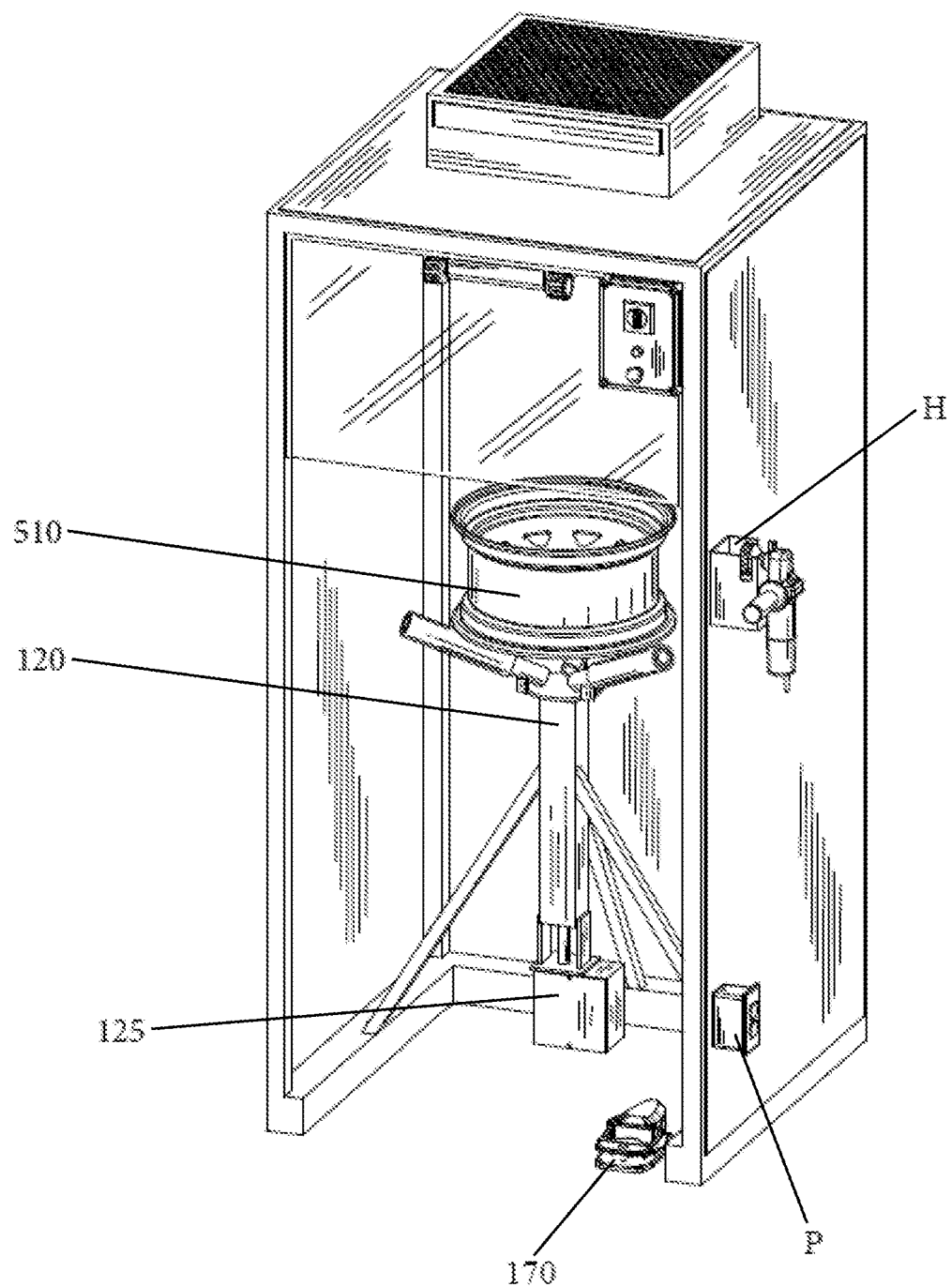
FIG. 5 illustrates an example wheel cleaning system with a mounted wheel rim.
Figure 6:
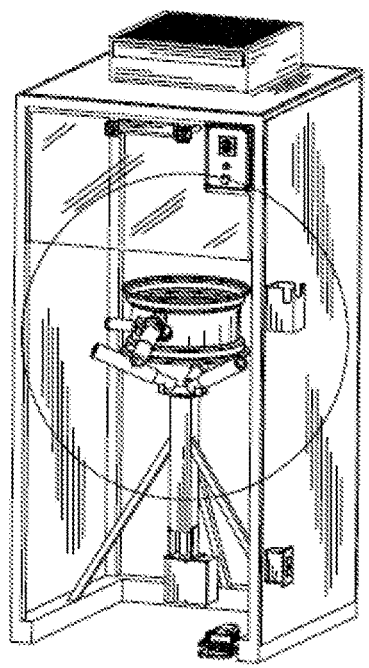
FIG. 6 illustrates an example wheel cleaning system and cleaning operation, in accordance with the subject of the invention.
Figure 7:
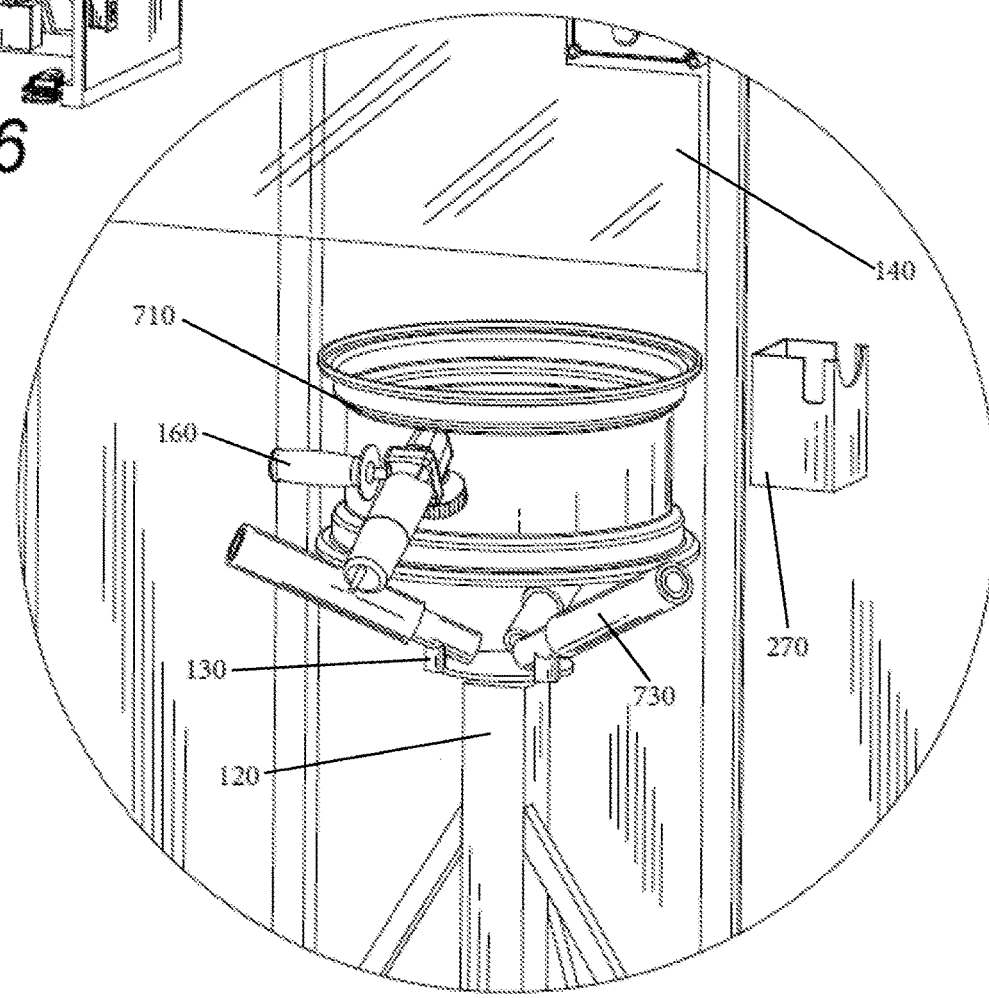
FIG. 7 illustrates a view of section 7-7 of FIG. 6, depicting the wheel cleaning system during a cleaning operation.

FIGS. 5-7 depict embodiments of the wheel cleaning system with the mounted wheel rim 510. During a cleaning operation, the wheel rim 510 may be placed horizontally on the stand assembly 120. In this example, the wheel rim is secured by a plurality of chucks attached to the turntable. As previously described, the stand 530 supports the weight of the turntable and wheel, and a turntable shaft fits within the vertical column of the stand into a motor unit 540. The motor unit rotates the shaft, thereby rotating the turntable and mounted rim about a vertical axis.

The turntable and chucks may be adjustable to secure and orient the wheel 510 in various positions. For example, the horizontal wheel position results in the rim spinning about a vertical axis of rotation. In this position, a standing user can steadily hold a grinder 720 or other manually-operated cleaning tool against the edge of the wheel rim, as depicted in FIGS. 6-7. The motor control unit controls the rotation and speed of the mounted wheel to further enhance the grinding process. The height of the stand 120, and the clearance below the shield 140 allows the user to hold the cleaning tool in a fixed position, or at various pressures, to clean a lip 710, edge, or other portion of the wheel rim. Moreover, the position of the wheel on the turntable can be adjusted depending on user preference, wheel size, or other considerations. As a result, a standing user can see inside of the enclosure through shield 140 while manually operating a tool to clean the wheel rim. The enclosure and stand assembly further enables the user to maneuver the cleaning tool in a variety of positions, while being protected from sparks, debris, and other particles during the cleaning process. Those particles can be more easily removed, due to the exhaust unit removing airborne particles during cleaning, and larger particles being contained within the enclosure.

FIG. 7 depicts a closer view of an example turntable and stand assembly during a cleaning operation. A plurality of cylindrically shaped chucks 730 are fastened to a circular turntable. As described above, in some embodiments, the chucks 730 are removable 740 and adjustable. The sizing of the chucks and turntable can also be variable, to accommodate wheels of various sizes and weights, for example. The chucks 235 may be comprised of or coated with a material to secure the mounted wheel rim and prevent slippage of the mounted wheel rim during rotation.

The stand 120 may comprise a vertical column to receive the shaft of the turntable, and a plurality of legs to support the vertical column and turntable assembly. When inserted in the vertical column, the base of the turntable shaft is inserted into the motor unit assembly below the vertical column, to rotate the turntable. In an embodiment, the length of the shaft is such that the circular turntable 740 sits just above the top of the vertical column, and rotates without friction or contact against the stand assembly 750.

A user can hold a grinder 160 against a rim 710 of the wheel during a corrosion removal cleaning process. The clearance beneath the shield 140 provides space for a standing user to hold the grinder inside the enclosure to contact the wheel, and to easily maneuver the grinder to enhance cleaning. The shield extends downward to interpose a standing user's sightline to the wheel rim and cleaning operation, thus protecting the user from sparks and debris created during the grinding process.

EXAMPLES

Example 1

A wheel cleaning system comprising a protective enclosure defining a covered work area for cleaning a wheel, the enclosure comprising a plurality of walls, a transparent shield, and at least one open portion to access a turntable for holding a wheel within the work area, the transparent shield extending downwards from an upper portion of the enclosure, and the at least one open portion extending downwards from a bottom edge of the shield; a stand supporting the turntable; a motor connected to the turntable, the motor operated by a controller; and an exhaust unit to remove airborne debris produced within the enclosure.

Example 2

The system of example 1, wherein the enclosure further comprises a raised or removable floor to facilitate cleaning debris produced within the enclosure.

Example 3

The system of example 1, wherein at least one portion of the plurality of walls is transparent.

Example 4

The system of example 1, wherein the enclosure protects a user from sparks and debris produced within the enclosure.

Example 5

The system of example 1, wherein in the stand supports the wheel at a height to allow a standing user to manually clean the wheel.

Example 6

The system of example 1, wherein a height of the stand is adjustable.

Example 7

The system of example 1, wherein the controller is a foot pedal controller.

Example 8

The system of example 1, wherein the motor rotates the turntable at a constant or variable speed.

Example 9

The system of example 1, wherein the enclosure has no open portions and comprises gloved openings for access into the work area.

Example 10

The system of example 9, wherein the enclosure further comprises a door to access the work area.

Example 11

The system of example 1, wherein the turntable further comprises a plurality of chucks to hold the wheel.

Example 12

The system of example 1, wherein the enclosure contains debris produced during a cleaning process.

Example 13

The system of example 1, further comprising a grinder to clean the wheel.

Example 14

The system of example 1, further comprising a tool holder on a wall of the enclosure.

Example 15

The system of example 1, wherein the exhaust unit comprises an exhaust fan, a filter, and an intake unit.

Example 16

The system of example 1, further comprising an exhaust control unit to control power to the exhaust unit.

Example 17

The system of example 16, wherein the exhaust control unit is located on the enclosure.

Example 18

A method comprising defining, with a protective enclosure, a work area for cleaning a wheel with a protective enclosure, the enclosure comprising a plurality of walls, a transparent shield, and at least one open portion to access a turntable for holding a wheel within the work area, the transparent shield extending downwards from a bottom edge of the shield; supporting the turntable with a stand; connecting a motor to the turntable, the motor operated by a controller; and removing airborne debris produced within the enclosure with an exhaust unit.

Example 19

The method of example 18, wherein the stand supports the wheel at a height to allow a standing user to manually clean the wheel.

Example 20

The method of example 18, wherein a height of the stand is adjustable.

Example 21

The method example 18, further comprising rotating the turntable at a constant or variable speed.

Example 22

The method of example 18, wherein the enclosure further comprises gloved openings.

Example 23

The method of example 18, further comprising holding the wheel on the turntable with a plurality of chucks.

Example 24

The method of example 18, further comprising containing, within the enclosure, debris produced during a cleaning process.

Example 25

The method of example 18, further comprising cleaning the wheel rim with a grinder.

Example 26

The method of example 18, wherein the exhaust unit comprises an exhaust fan, a filter, and an intake unit.

Example 27

The method of example 18, further comprising controlling power to the exhaust unit with an exhaust control unit.

Example 28

The system of example 1, wherein the enclosure includes a panel that covers the open portion to completely enclose the wheel within the enclosure, the door comprises gloved openings for access into the work area.

Example 29

The system of example 1, further comprising a grinder holder mounted on a sidewall of the enclosure at adjacent to the open portion This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of the disclosures herein.

What is claimed:

1. A wheel cleaning system comprising:
a protective enclosure defining a covered work area for cleaning an associated wheel, the enclosure comprising a plurality of walls, a transparent shield, and a turntable for holding a wheel within the work area, the transparent shield extending downwards from an upper portion of the enclosure to a point above the turntable, thereby defining an open portion providing access to the turntable and the associated wheel, the open portion extending between a lower edge of the transparent shield and a base of the enclosure and further including a tool clearance between at least the lower edge of the transparent shield and a support plane defined by the turntable;
a stand supporting the turntable;
a motor connected to the turntable, the motor operated by a controller; and
an exhaust unit to remove airborne debris produced within the enclosure.

2. The system of claim 1, wherein the enclosure further comprises a raised or removable floor to facilitate cleaning debris produced within the enclosure.

3. The system of claim 1, wherein at least one portion of the plurality of walls is transparent.

4. The system of claim 1, wherein in the stand is configured to support the associated wheel at a height to allow a standing user to manually clean the associated wheel.

5. The system of claim 1, wherein a height of the stand is adjustable.

6. The system of claim 1, wherein the controller is a foot pedal controller.

7. The system of claim 1, wherein the motor is configured to rotate the turntable at a variable speed.

8. The system of claim 1, wherein the turntable further comprises a plurality of chucks and a vertical shaft, each of the plurality of chucks extending outwardly from the vertical shaft and providing a platform for mounting the associated wheel.

9. The system of claim 1, further comprising a grinder to clean the associated wheel.

10. The system of claim 1, further comprising a tool holder on a wall of the enclosure, and a power supply, wherein the power supply is located on the wall of the enclosure below the tool holder.

11. The system of claim 1, wherein the exhaust unit comprises an exhaust fan, a filter, and an intake unit.

12. The system of claim 1, further comprising an exhaust control unit to control power to the exhaust unit.

13. The system of claim 12, wherein the exhaust control unit is located on the enclosure.

14. The system of claim 1, wherein the stand further comprises a plurality of legs affixed to the enclosure.

15. A wheel cleaning system comprising:
a protective enclosure defining a covered work area for cleaning an associated wheel, the enclosure comprising a plurality of walls, a transparent shield, and a turntable for holding the associated wheel within the work area, the transparent shield extending downwards from an upper portion of the enclosure to a point above the turntable, thereby defining an open portion providing access to the turntable, the access portion extending between a lower edge of the transparent shield and a base of the enclosure, and the turntable including a plurality of chucks and a vertical shaft, each of the plurality of chucks extending outwardly from the vertical shaft and providing a platform for mounting the associated wheel;
a stand supporting the turntable, the stand comprising a plurality of legs affixed to the enclosure;
a motor connected to the turntable, the motor operated by a controller; and an exhaust unit to remove airborne debris produced within the enclosure; wherein the enclosure includes a panel that covers the access portion to completely enclose the associated wheel within the enclosure, the panel comprising gloved openings for access into the work area.

16. The system of claim 1 further comprising a tool holder mounted on a sidewall of the enclosure adjacent to the open portion.

17. The system of claim 16, wherein the enclosure further comprises a door to access the work area.

18. A method comprising:
defining, with a protective enclosure, a work area for cleaning an associated wheel with a protective enclosure, the enclosure comprising a plurality of walls, a transparent shield, and a turntable for holding the associated wheel within the work area, the transparent shield extending downwards from a bottom edge of the shield to a point above the turntable, thereby defining an open portion providing access to the turntable, the open portion extending between a lower edge of the transparent shield and a base of the enclosure and further including a tool clearance between at least the lower edge of the transparent shield and a support plane defined by the turntable;
supporting the turntable with a stand;
connecting a motor to the turntable, the motor operated by a controller; and
removing airborne debris produced within the enclosure with an exhaust unit.

19. The method of claim 18, wherein the stand supports the associated wheel at a height to allow a standing user to manually clean the associated wheel.

20. The method of claim 18, wherein a height of the stand is adjustable.

\* \* \* \* \*